United States Patent
Ginsberg et al.

(10) Patent No.: US 10,281,254 B2
(45) Date of Patent: May 7, 2019

(54) PHASED ARRAY LIDAR IN ORDNANCE CONTROL

(71) Applicant: Rosemount Aerospace Inc., Burnsville, MN (US)

(72) Inventors: David Ginsberg, Granby, CT (US); William A. Veronesi, Hartford, CT (US); Joseph V. Mantese, Ellington, CT (US); Todd Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/270,829

(22) Filed: Sep. 20, 2016

(65) Prior Publication Data

US 2018/0080751 A1    Mar. 22, 2018

(51) Int. Cl.
| | |
|---|---|
| *F42C 13/02* | (2006.01) |
| *G01S 17/88* | (2006.01) |
| *F41G 9/02* | (2006.01) |
| *G01S 17/89* | (2006.01) |
| *G01S 7/481* | (2006.01) |

(52) U.S. Cl.
CPC ............ *F42C 13/023* (2013.01); *F41G 9/02* (2013.01); *G01S 7/4817* (2013.01); *G01S 17/88* (2013.01); *G01S 17/89* (2013.01)

(58) Field of Classification Search
CPC ........................................ G01S 17/88
USPC ............................................. 102/213
See application file for complete search history.

(56) References Cited

U.S. PATENT DOCUMENTS

| | | | |
|---|---|---|---|
| 4,733,609 | A | 3/1988 | Goodwin et al. |
| 7,893,390 | B2 | 2/2011 | Fisch et al. |
| 9,019,375 | B1 | 4/2015 | Whelan et al. |
| 2013/0044309 | A1 | 2/2013 | Dakin et al. |
| 2013/0248647 | A1 | 9/2013 | Ell et al. |

OTHER PUBLICATIONS

Extended European Search Report for EP Application No. 17186008.3, dated Feb. 13, 2018, 9 pages.

*Primary Examiner* — Reginald S Tillman, Jr.
(74) *Attorney, Agent, or Firm* — Kinney & Lange, P.A.

(57) ABSTRACT

Apparatus and associated methods relate to controlling an explosive burst event of a ballistic ordnance, based on a ground surface topography mapped by a phased-array LIDAR system. The ground surface topography is mapped using an integrated photonics LIDAR system configured to: generate a beam of coherent light; non-mechanically steer a beam of coherent light over a solid angle about an ordnance axis; and detect the beam reflected from the ground surface. The integrated photonics LIDAR system is further configured to map the ground surface topography, based on a functional relation between an angle of the beam and a time difference between generating the beam and detecting the beam reflected from the ground surface. A timing and/or direction of the explosive burst can be controlled, based on the calculated ground surface topography, so as to advantageously realize a desired effect of the explosion.

20 Claims, 5 Drawing Sheets

PHASED ARRAY LIDAR IN ORDNANCE CONTROL

BACKGROUND

Various types of fuse technologies can be used for activating an explosive on a ballistic ordnance, such as a bomb, artillery, and/or a mortar, for example. One such fuse technology is called Height of Burst (HoB) fusing. Using this technology, an ordnance can be affixed with a HoB sensor, which detects the vertical distance between the ordnance and a ground surface. As the ordnance approaches the ground surface, the HoB sensor determines the height that the ordnance is above the ground surface. When the height falls below a predetermined threshold, the HoB sensor outputs a signal indicative of this condition to a burst controller. The burst controller can then initiate a burst sequence, which causes an explosive device to detonate. These HoB sensors can only sense a vertical height above a ground target and cannot detect topographical features. As such, the explosive direction is predetermined prior to launch, and is independent of topographical features. Predetermined explosive patterns do not always result in the optimal explosion direction. There is a need to shape the ordnance trajectory and/or the explosion pattern based on the topographical features of a ground surface to optimize an explosion event of a ballistic ordnance.

SUMMARY

Apparatus and associated devices relate to a system for controlling a burst event of an explosive charge carried by a ballistic ordnance. The system includes an integrated-photonics LIDAR module configured to be carried by the ballistic ordnance. The integrated-photonics LIDAR module is configured to generate pulses of coherent light. The integrated-photonics LIDAR module is configured to emit each of the generated pulses of coherent light at a corresponding directed angle relative to an optical axis, each of the corresponding directed angles being within a scanning field of view. The integrated-photonics LIDAR module is configured to detect the pulses of coherent light reflected from a ground surface. The integrated-photonics LIDAR module is configured to determine, based on a time difference between generating the pulses of coherent light and detecting the pulses of coherent light reflected from the ground surface, a distance between the system and the ground surface. The integrated-photonics LIDAR module is also configured to generate, based on a functional relation between the directed angle and the determined distance between the system and the ground surface, a topographical map of the ground surface. The system includes a burst control module coupled to the integrated-photonics LIDAR module. The burst control module configured to control, based on the determined distance between the system and the ground surface, a timing of the burst event of the explosive charge carried by the ballistic ordnance.

Some embodiments relate to a method for controlling a burst event of an explosive charge carried by a ballistic ordnance. The method includes generating pulses of coherent light. The method includes non-mechanically directing each of the generated pulses of coherent light at a corresponding directed angle relative to an optical axis, each of the corresponding directed angles being within a scanning field of view. The method detecting the pulses of coherent light reflected from a ground surface. The method includes determining, based on a time difference between generating the pulses of coherent light and detecting the pulses of coherent light reflected from the ground surface, a distance between the system and the ground surface. The method includes generating, based on a functional relation between the directed angle and the determined distance between the system and the ground surface, a topographical map of the ground surface. The method also includes controlling, based on the determined distance between the system and the ground surface, a timing of the burst event of the explosive charge carried by the ballistic ordnance.

Some embodiments relate to a system for controlling an explosive burst event of a ballistic ordnance. The system includes a ballistic ordnance having an explosive charge. The system a phased-array LIDAR system coupled to the ordnance. The phased-array LIDAR system includes: a laser; a two-dimensional array of light emitters, each optically coupled to the laser via an optical wave guide; a plurality of phase modulators, each corresponding to one of the light emitters in the two-dimensional array; and an optical detector. The system one or more processors and computer-readable memory. The computer readable memory is encoded with instructions that, when executed by the one or more processors, cause the system to generate, at an emission time, a pulse of coherent light, using the laser. The computer readable memory is encoded with instructions that, when executed by the one or more processors, cause the system to coordinate, using the plurality of phase modulators, the plurality of phase modulators so that a combined emission of two-dimensional array forms a directional beam having a directed angle relative to an optical axis, each of the directed angles being within a scanning field of view. The computer readable memory is encoded with instructions that, when executed by the one or more processors, cause the system to detect, at a detection time, the directional beam reflected by a ground surface, using the optical detector. The computer readable memory is encoded with instructions that, when executed by the one or more processors, cause the system to calculate, based on a difference between the detection time and the emission time, a distance between the system and the ground target. The computer readable memory is encoded with instructions that, when executed by the one or more processors, also cause the system to control an explosive charge when the calculated distance between the system and the ground target is substantially equal to the predetermined Height of Burst (HoB).

DETAILED DESCRIPTION

Apparatus and associated methods relate to controlling an explosive burst event of a ballistic ordnance, based on a ground surface topography mapped by a phased-array LIDAR system carried by the ballistic ordnance. The ground surface topography is mapped using an integrated photonics LIDAR system configured to generate one or more beams of coherent light that are projected in a plurality of directions about an ordnance axis. For example, an exemplary integrated photonics LIDAR system can non-mechanically steer a beam of coherent light over a solid angle about an ordnance axis, and detect the beam reflected from the ground surface. The integrated photonics LIDAR system can be further configured to map the ground surface topography, based on a functional relation between an angle of the beam and a time difference between generating the beam and detecting the beam reflected from the ground surface. A timing and/or direction of the explosive burst can be controlled based on the calculated ground topography. The timing and/or direction of the explosive burst event can be controlled so as to advantageously realize a desired effect of the explosion.

Figure 1:
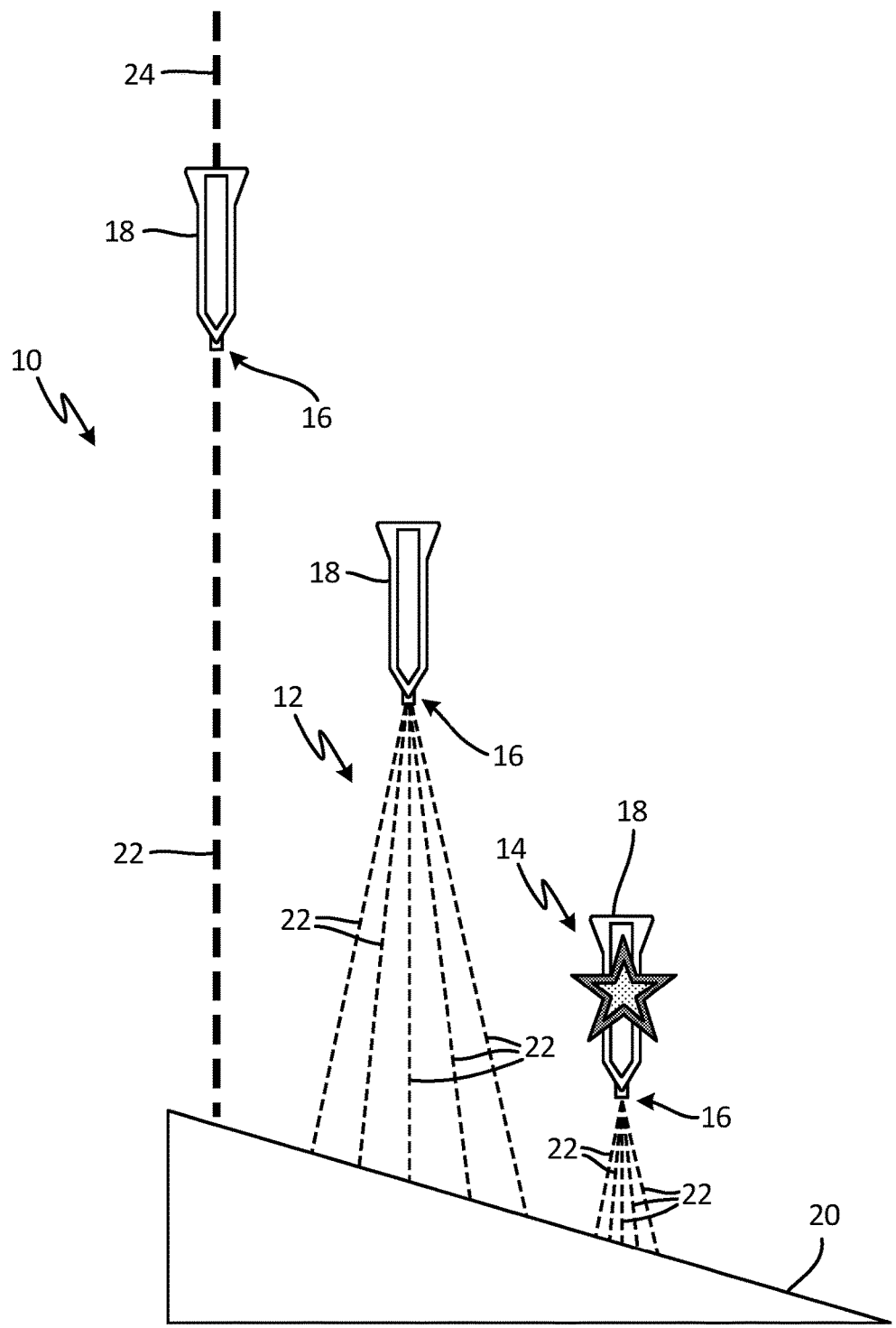
FIG. 1 is a schematic diagram of exemplary modes of operation of an ordnance equipped with a LIDAR ground surface topography mapping system.

FIG. 1 is a schematic diagram of exemplary modes of operation of an ordnance equipped with a LIDAR ground surface topography mapping system. In FIG. 1, three modes of operation 10, 12, 14 of LIDAR system 16 are depicted. When ballistic ordnance 18 is far from ground surface 20, LIDAR system 16 operates in range finding mode 10. In range finding mode 10, LIDAR system 16 generates a beam or pulse of coherent light 22 and directs the generated beam or pulse of coherent light 22 in a direction parallel to longitudinal axis 24 of ballistic ordnance 18. LIDAR system 16 detects the pulse of coherent light 22 reflected from ground surface 20 and calculates a time difference between a detection time when the pulse of coherent light 22 is detected and an emission time when the pulse of coherent light 22 is emitted. The calculated time difference corresponds to a spatial distance between ballistic ordnance 18 and ground surface 20. One or more of these modes of operation 10, 12, 14 can be used in a particular ordnance to accomplish a particular mission objective.

As ballistic ordnance 18 approaches ground surface 20 below a threshold height, LIDAR system 16 operates in ground-surface mapping mode 12. In ground-surface mapping mode 12, LIDAR system 16 generates multiple pulses of coherent light 22 and emits the generated pulses of coherent light 22 at various directed angles with respect to the longitudinal axis of the ballistic ordnance. The directed angles are within a solid angle in a forward direction of ballistic ordnance 18. LIDAR system 16 then detects the multiple pulses of coherent light 22 reflected from ground surface 20 and calculates time differences between the detection times when the pulses of coherent light 22 are detected and the emission times when the pulses of coherent light 22 are emitted. The calculated time differences correspond to spatial distances between ballistic ordnance 18 and ground surface 20. LIDAR system 16 generates a topographical map of ground surface 20, based on a functional relation between the calculated time differences and the corresponding directed angles of emission of the generated pulses of coherent light.

When the distance between ballistic ordnance 18 and ground surface 20 approaches and/or becomes smaller than a Height of Burst (HoB) parameter, then LIDAR system 16 operates in terminal-ballistic mode 14. In terminal-ballistic mode 14, LIDAR system 16 generates a signal that initiates a burst event. The generated signal is indicative of a direction for an explosive charge to be directed. In some embodiments the direction may be calculated such that the explosive charge is in a direction normal to the ground surface, based on the generated topographical map. In some embodiments, the explosive charge is directed toward a predetermined target. In such an embodiment, the topographical map may have image features corresponding to features of the predetermined target. These corresponding image features may be used to calculate a direction toward the predetermined target.

Figure 2:
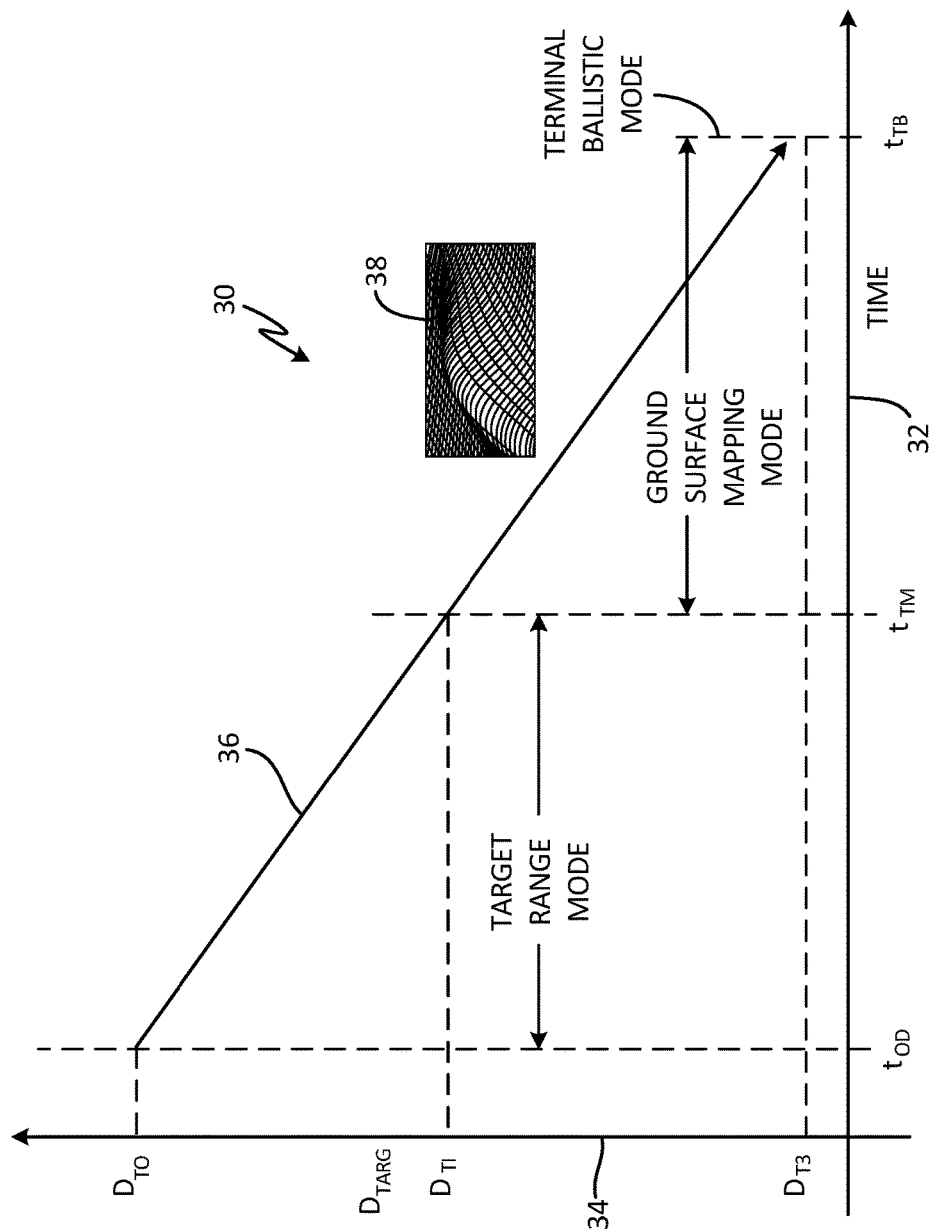
FIG. 2 is a graph depicting the modes of operation of an exemplary LIDAR system as these modes relate to the target distance and the time of flight.

FIG. 2 is a graph depicting the modes of operation of an exemplary LIDAR system as these modes relate to the target distance and the time of flight. In FIG. 2, graph 30 includes horizontal axis 32, vertical axis 34, and target distance/time relation 36 of a ballistic ordnance. Horizontal axis 32 corresponds to time. Vertical axis 34 corresponds to target distance. At time $t_{OD}$, the ballistic ordnance is deployed. The ballistic ordnance can be deployed in various manners. For example, the ballistic ordnance may be an artillery ordnance, which may be fired from a cannon. The ballistic ordnance may be a mortar, which may be launched from a ground position. The ballistic ordnance may be a bomb which may be dropped from an aircraft, for example, as is shown in the FIG. 2 depiction. After being deployed at time $t_{OD}$, LIDAR system 16 (depicted in FIG. 1) begins operating in target range mode. In ground launched embodiments, the trajectory of the ballistic ordnance may be parabolic. In such embodiments, the target range mode may be initiated after the ballistic ordnance reaches apogee. While operating in target range mode, LIDAR system 16 calculates the range or distance between LIDAR system 16 and ground surface 20 (depicted in FIG. 1). This calculated range is represented by target distance/time relation 36.

LIDAR system 16 continues operation using target range mode until time $t_{TM}$. At time $t_{TM}$, LIDAR system 16 transitions from target range mode to ground surface mapping mode. In some embodiments, LIDAR system 16 transitions from target range mode to ground surface mapping mode when the target range falls below a predetermined threshold. When operating in ground surface mapping mode, LIDAR system 16 generates pulses of coherent light and emits the generated pulses over a multitude of directions relative to longitudinal axis 24 of ballistic ordnance 10, so as to scan a region of ground surface 20. When operating in ground surface mapping mode, LIDAR system 16 also detects the emitted pulses of coherent light reflected from ground surface 20. LIDAR system 16 then calculates the time difference between each time of emission of a pulse of coherent light and a corresponding time of detection of the pulsed of coherent light reflected by ground surface 20. LIDAR system 16 then generates topographical map 38 of ground surface 20.

In some embodiments, LIDAR system 16 updates or generates additional topographical maps 38 when operating in ground surface mapping mode. For example, LIDAR system 16 may identify and/or refine a predicted point of impact within topographical map 38. LIDAR system 16 may also compare image features within topographical map 38 with features corresponding to a predetermined target. Based on the comparison, LIDAR system 16 may associate various image features with the predetermined target. LIDAR system 16 may then determine image coordinates corresponding to the predetermined target, based on image coordinates corresponding to the image features that correspond to the predetermined target. LIDAR system 16 may then determine a direction of the predetermined target relative to longitudinal axis 24 (depicted in FIG. 1) of ballistic ordnance 18 (also depicted in FIG. 1), based on the image coordinates corresponding to the predetermined target.

LIDAR system 16 continues operation using ground surface mapping mode until time $t_{TB}$. At time $t_{TB}$, LIDAR system 16 transitions from ground surface mapping mode to terminal ballistic mode. In some embodiments, LIDAR system 16 transitions from ground surface mapping mode to terminal ballistic mode when the range to target and/or ground surface 20 falls below a predetermined threshold or HoB. When operating in terminal ballistic mode, LIDAR system 16 controls a burst event of ballistic ordnance 18. In various embodiments, various manners of burst event control may be employed. For example, in some embodiments, LIDAR system 16 controls a timing of the burst event based on a comparison between the distance $D_{TB}$ to ground surface 20 and a predetermined HoB. If, for example, the distance $D_{TB}$ to ground surface 20 is less than or equal to the predetermined HoB, then LIDAR system 16 may generate a signal that initiates the burst event.

In some embodiments, LIDAR system 16 controls, based on the generated topographical map of the ground surface, a direction of the burst event. For example, LIDAR system 16 may generate a burst control signal configured to direct an explosive charge carried by ballistic ordnance 18 in a target direction. The target direction may be a direction normal to ground surface 20 at the predicted point of impact, for example. In some embodiments, the target direction may be the determined direction of the predetermined target relative to longitudinal axis 24 of ballistic ordnance 18.

Figure 3:
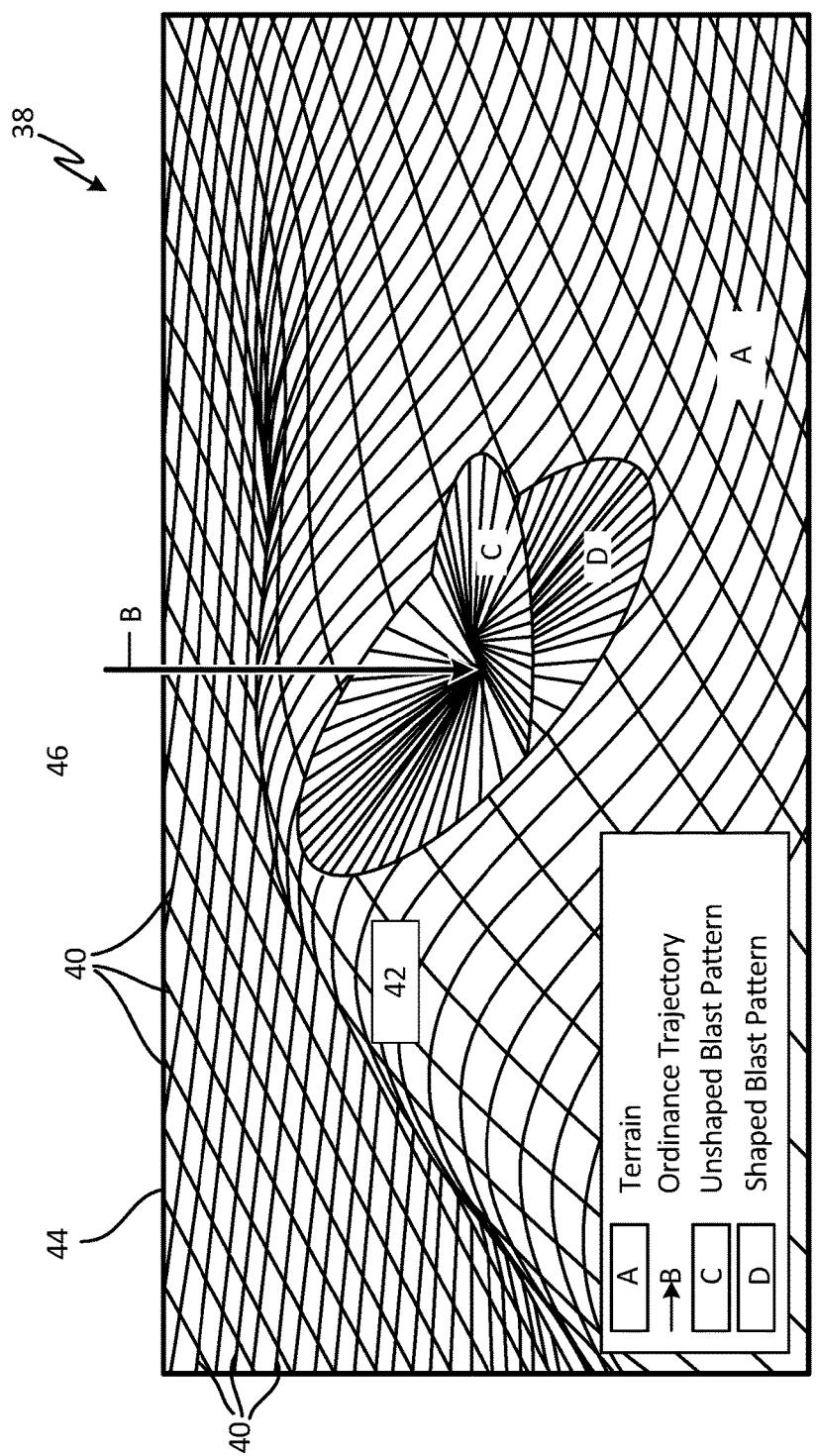
FIG. 3 is an exemplary topographical map of ground surface.

FIG. 3 is an exemplary topographical map of ground surface. In FIG. 3, topographical map 38 depicted in FIG. 2 is shown in greater detail. Topographical map 38 includes orthogonal surface lines 40 depicting ground surface 20. Orthogonal surface lines 40 are arranged so as to help visualize three-dimensional topography of ground surface 20. Topographical map 38 includes hill 42 in the foreground and lowlands 44 in the background. Predicted point of impact 46 is annotated on topographical map 38. Also annotated on topographical map 38 are two different blast patterns 48, 50, each of which corresponds to a different target direction of the explosive charge in the burst event. Blast pattern 48 may correspond to a substantially vertical target direction, for example. Blast pattern 50 may correspond to a target direction that is substantially normal to ground surface 20 at predicted point of impact 46. These blast patterns are examples of blast patterns that may be controlled by LIDAR system 16.

Figure 4:
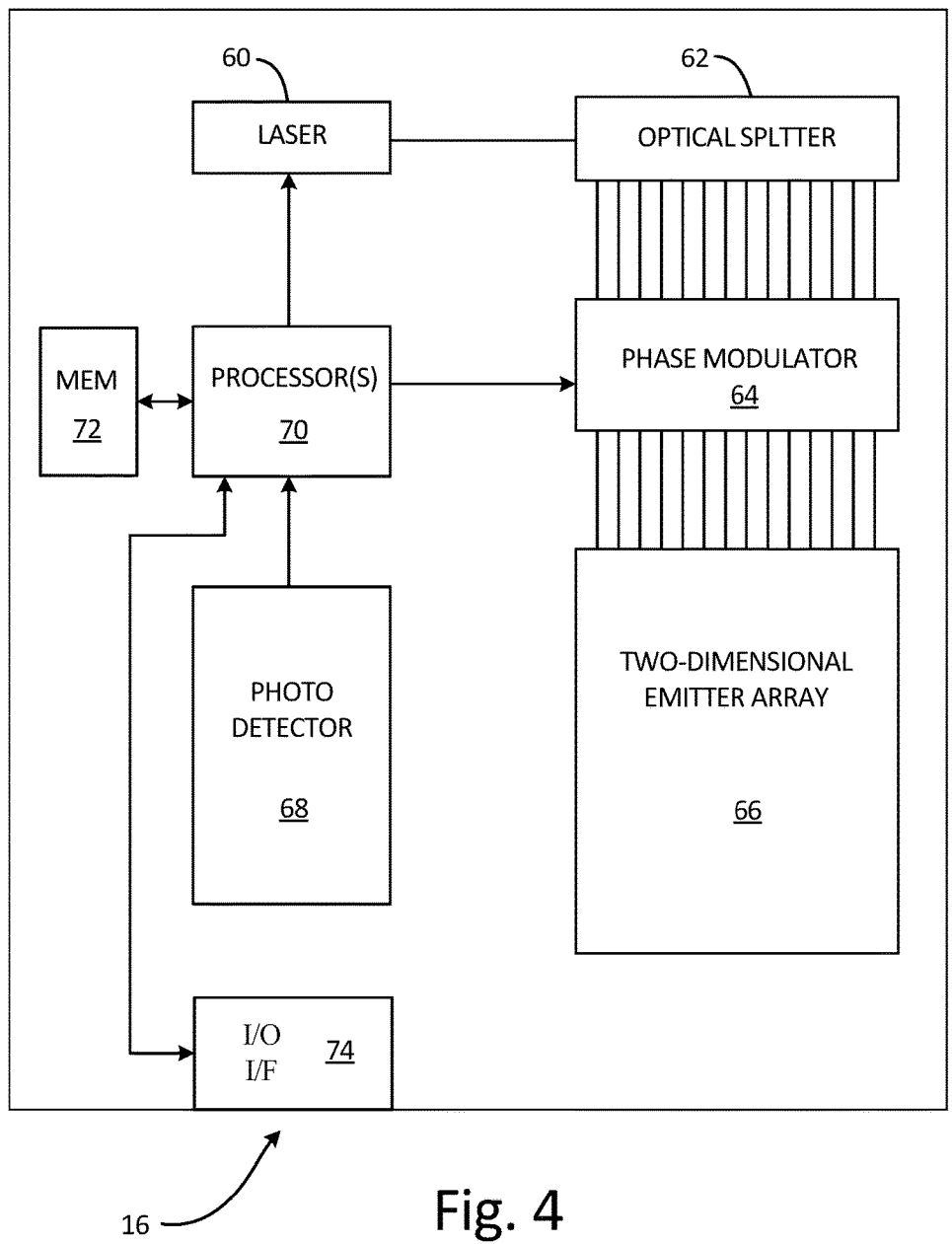
FIG. 4 is a block diagram of an exemplary system for controlling a burst event of an explosive charge carried by a ballistic ordnance.

FIG. 4 is a block diagram of an exemplary system for controlling a burst event of an explosive charge carried by a ballistic ordnance. In FIG. 4, LIDAR system 16 includes laser 60, optical splitter 62, phase modulators 64, two-dimensional array of optical emitters 66, and photo detector 68. Processor(s) 70 is electrically connected to laser 60, phase modulators 64 and photodetector 68. Processor(s) 70 controls the laser's generation of pulses of coherent light as well as coordinating the phases of the portions of the generated pulses emitted by the two-dimensional array of optical emitters 66, so as to control a beam direction of light emitted by the two-dimensional array of optical emitters 66. Processor(s) 70 receive signals indicative of the beam reflected from ground surface 20 as sensed by photodetector 68. Processor(s) 70 is also in electrical communication with memory 72 and Input/Output (I/O) Interface (I/F) 74.

As illustrated in FIG. 4, LIDAR system 16 includes optical elements 62, 64, 66, opto-electrical elements 60, 68, electronic components 72, 74, and processor(s) 70. However, in certain examples, LIDAR system 16 can include more or fewer components. For example, some embodiments, can include additional or fewer optical elements, such as lasers, and/or detectors, for example. Some embodiments may be capable of simultaneously projecting more than one beam of coherent light. Such embodiments may be able to rapidly map a surface topography. Processor(s) 70, in one example, is configured to implement functionality and/or process instructions for execution within LIDAR system 16. For instance, processor(s) 70 can be capable of processing instructions stored in memory 72. Examples of processor(s) 70 can include any one or more of a microprocessor, a controller, a digital signal processor (DSP), an application specific integrated circuit (ASIC), a field-programmable gate array (FPGA), or other equivalent discrete or integrated logic circuitry.

In some embodiments, optical components 62, 64, 66 and/or opto-electrical components 60, 68 can be manufactured as an integrated photonics device. For example, exemplary phase modulators 64 may include waveguides that have electronically controllable refractive indices. The refractive indices of some such waveguides can be controlled by changing the carrier concentration within the waveguides. Phase modulation control can also be performed by controlling the frequency of coherent light and passing that light through a grating structure, for example. Similarly, various types of structures can be used for other opto-electrical components 60, 68 and optical components 62, 66. For example, a single photodetector 68 can be used, or a two-dimensional array of photonic receivers can be used with phase relations between the photonic receivers controlled so as to make the two-dimensional array of photonic receivers sensitive to optical beams along specific angles with respect to the optical axis. The two-dimensional array of photonic receivers provides a combined signal detectable by a photodetector. Such integrated photonics devices can provide optical beam steering functions using non-mechanical means as described above. Such beam steering can be used in beam generation and/or in beam detection. In some embodiments, use of such integrated photonic devices can advantageously be used in high acceleration applications, such as artillery ballistic ordnances.

Processor(s) 70 interfaces with both opto-electrical elements 60, 68 and electronic components 72, 74. In some embodiments, processor(s) 70 may perform some or all of the operations associated with LIDAR system 16. Such operations may include detection of pulses of coherent light from a signal generated by photodetector 68, calculating time differences between emitted pulses of coherent light by laser 60 and detected pulses of coherent light by photodetector 68, coordinating phase modulators 64 so as to steer an optical beam of coherent light at a specific angle with respect to an optical axis, and generating a topographical map of ground surface 20. In some embodiments, processor(s) 70 may perform image processing algorithms on topographical map 38 generated by LIDAR system 16. For example, processor(s) 70 may compare image features of generated topographical map 38 with image features associated with a predetermined target. Processor(s) 70 may also identify pixel coordinates corresponding to image features of topographical map 38 that are found to match and/or correspond to image features of the predetermined target.

Memory 72 can be configured to store information within LIDAR system 16 during operation. Memory 72, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 72 is a temporary memory, meaning that a primary purpose of memory 72 is not long-term storage. Memory 72, in some examples, is described as volatile memory, meaning that memory 72 does not maintain stored contents when power to LIDAR system 16 is turned off. Examples of volatile memories can include random access memories (RAM), dynamic random access memories (DRAM), static random access memories (SRAM), and other forms of volatile memories. In some examples, memory 72 is used to store program instructions for execution by processor(s) 70. Memory 72, in one example, is used by software or applications running on LIDAR system 16 (e.g., a software program implementing designated target detection) to temporarily store information during program execution.

Memory 72, in some examples, also includes one or more computer-readable storage media. Memory 72 can be configured to store larger amounts of information than volatile memory. Memory 72 can further be configured for long-term storage of information. In some examples, memory 72 includes non-volatile storage elements. Examples of such non-volatile storage elements can include magnetic hard discs, optical discs, flash memories, or forms of electrically programmable memories (EPROM) or electrically erasable and programmable (EEPROM) memories. Memory 72 can include program segments, pulse detector segments, pattern sequence recognition segments, and image processing segments, etc.

LIDAR system 16 also includes input/output interface 74. In some embodiments, input/output interface 74 can utilize communications modules to communicate with external devices via one or more networks, such as one or more wireless or wired networks or both. Input/output interface 74 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

In some embodiments, input/output interface 74 can be used to facilitate communications between LIDAR system 16 and an ordnance guidance system. For example, an ordnance can be equipped with airflow control surfaces so as to provide control of a trajectory. Such ordnances can have their trajectories controlled so as to minimize a target miss distance, or to provide for a desired ordnance impact angle with the ground surface and/or target. In some embodiments, the ordnance can have a fixed pre-specified explosion pattern. The mapped ground topography provided by LIDAR system 16 can be communicated to the ordnances so that the impact angle is optimized and/or the target miss distance is minimized, for example. In some embodiments, the ordnance guidance system can control an ordnance's trajectory based on data provided by LIDAR system 16 in addition to data provided by inertial measurement systems, such as, for example, gyroscopes, etc.

Figure 5:
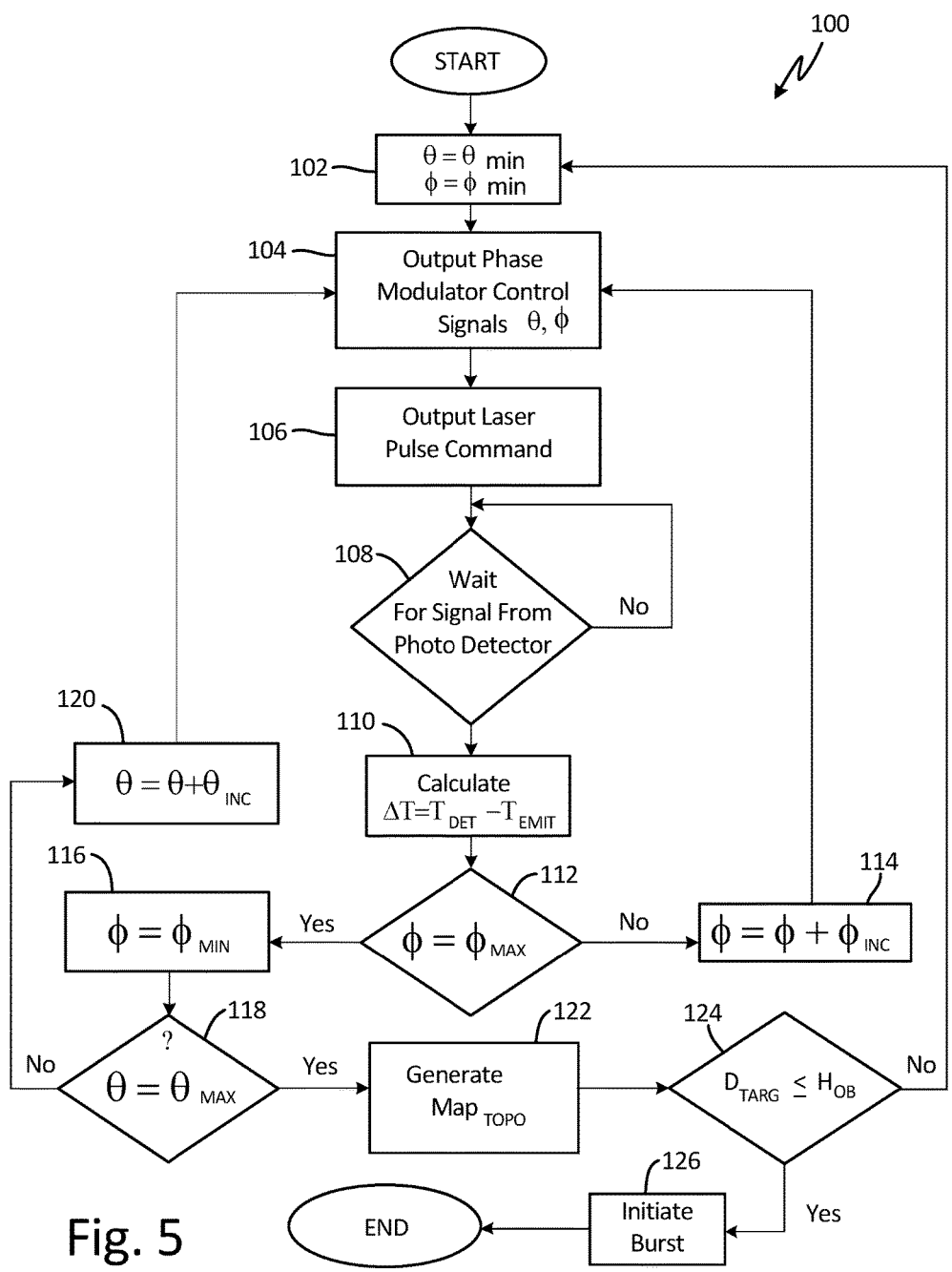
FIG. 5 is a flowchart of an exemplary for controlling a burst event of an explosive charge carried by a ballistic ordnance.

FIG. 5 is a flowchart of an exemplary method for controlling a burst event of an explosive charge carried by a ballistic ordnance. In FIG. 5, method 100 is depicted from the vantage point of processor(s) 70 of FIG. 4. Method 100 begins at step 102 where processor(s) 70 initializes indices θ and φ to equal $\theta_{MIN}$ and $\varphi_{MIN}$, respectively. Angles θ and φ can represent x-z and y-z angles with respect to a z-axis aligned with the optical axis. Method then 100 proceeds to step 104 where processor(s) 70 outputs signals to phase modulators 64 that coordinate the modulators such that two-dimensional emitter array 66 will emit a beam at the angles θ, φ with respect to the z-axis or optical axis. Then, at step 106, processor(s) 70 sends a command signal to laser 60 to generate a pulse of coherent light. Then, at step 108, processor(s) 70 waits to receive a signal from photodetector 68 indicative of the emitted beam reflected from ground surface 20.

At step 110, processor(s) 70 determines, based on a time difference between generating the pulses of coherent light and detecting the pulses of coherent light reflected from ground surface 20, a distance between the LIDAR system 16 and ground surface 20. Then, at step 112, processor(s) 70 compares angle φ with angle $\varphi_{MAX}$. If, at step 112, φ is not equal to $\varphi_{MAX}$, then method 100 proceeds to step 114 where processor(s) 70 increments angle φ by increment $\varphi_{INC}$. After step 114, method 100 returns to step 104 where processor(s) 70 outputs signals to phase modulators 64 that coordinate the modulators such that two-dimensional emitter array 66 with emit a beam at the new angles θ, φ with respect to the optical axis. If, however, at step 112, φ is equal to $\varphi_{MAX}$, then method 100 proceeds to step 116 where processor(s) 70 reinitializes φ to equal $\varphi_{MIN}$.

After step 116, method 100 proceeds to step 118, where processor(s) 70 compares angle θ with angle $\theta_{MAX}$. If, at step 118, θ is not equal to $\theta_{MAX}$, then method 100 proceeds to step 120 where processor(s) 70 increments angle θ by increment $\theta_{INK}$. After step 120, method 100 returns to step 104 where processor(s) 70 outputs signals to phase modulators 64 that coordinate the modulators such that two-dimensional emitter array 66 with emit a beam at the new angles θ, φ with respect to the optical axis. If, however, at step 118, θ is equal to $\theta_{MAX}$, then method 100 proceeds to step 122 where processor(s) 70 generates, based on a functional relation between the directed angle and the determined distance between the system and the ground surface, a topographical map of the ground surface.

Method 100 proceeds from step 122 to step 124, where processor(s) 70 compares a calculated distance to target $D_{TARG}$ with a predetermined Height of Burst (HoB). If, at step 124, $D_{TARG}$ is not less than or equal to HoB, then method 100 returns to step 102 where processor(s) 70 reinitializes indices θ and φ to equal $\theta_{MIN}$ and $\varphi_{MIN}$, respectively, so that additional information can be gained for use in topographical map generation. In some embodiments a new topographical map may be generated in a new iteration. In some embodiments, the topographical map generated will be improved with additional data as the ballistic ordnance approaches ground surface 20. In some embodiments, a partial scan of a portion of the mapped ground surface can be scanned so as to improve resolution in the partial scan portion. If, however, at step 124, $D_{TARG}$ is less than or equal to HoB, then method 100 proceeds to step 126 where processor(s) 70 initiates a burst event. In some embodiments, processor(s) 70 may output a command signal to initiate the burst event to Input/Output Interface 74. In some embodiments, the command signal may correspond to an angle command, which controls the angle along which the burst event will be directed.

The following are non-exclusive descriptions of possible embodiments of the present invention.

Apparatus and associated devices relate to a system for controlling a burst event of an explosive charge carried by a ballistic ordnance. The system includes a controller. The system includes a laser electrically coupled to the controller. The laser generates, in response to receiving from the controller a timing signal at an emission time, a pulse of coherent light. The system includes a two-dimensional array of light emitters, each optically coupled to receive a portion of the generated pulse of coherent light from the laser via an optical wave guide, and to emit the received portion of coherent light. The system includes a plurality of phase modulators electrically coupled to the controller. The plurality of phase modulators are configured to coordinate, in response to receiving from the controller a signal indicative of an emission angle, relative phases of the emitted portions of optical light so as to form a beam of light directed at the emission angle. The system includes an optical detector electrically coupled to the controller, the optical detector configured to detect the directed beam of light reflected by a ground surface at a detection time. The controller is further configured to calculate, based on a difference between the detection time and the emission time, a distance between the system and the ground surface. The controller is further configured to generate a burst control signal configured to initiate the burst event of the explosive charge carried by the ballistic ordnance.

A further embodiment of the foregoing system, wherein the burst control signal can be generated in response to the calculated distance between the system and the ground target being less than a predetermined Height of Burst (HoB).

A further embodiment of any of the foregoing systems, wherein controller can be further configured to: coordinate the laser and the phase modulators to form a plurality of beams to be emitted over a corresponding plurality of emission angles; and generate, based on a functional relation between the calculated distances and the emission angles corresponding to the plurality of beams, a topographical map of the ground surface.

A further embodiment of any of the foregoing systems, wherein the generated burst control signal can be indicative of a burst direction relative to the optical axis.

A further embodiment of any of the foregoing systems, wherein the burst direction can correspond to a direction substantially normal to the ground surface.

A further embodiment of any of the foregoing systems, wherein the controller can be further configured to compare features of the generated topographical map of the ground surface with features of a predetermined target.

A further embodiment of any of the foregoing systems, wherein the controller can be further configured to determine, based on the comparison of features of the generated topographical map of the ground surface with features of the predetermined target, a direction of the predetermined target relative to the optical axis.

A further embodiment of any of the foregoing systems, wherein the generated burst control signal is indicative of a burst direction relative to the optical axis.

A further embodiment of any of the foregoing systems, wherein the burst direction corresponds to the determined direction of the predetermined target.

A further embodiment of any of the foregoing systems, wherein the laser, the two-dimensional array of optical emitters, the wave guides and the phase modulators comprise a unitary integrated photonics device.

Some embodiments relate to a method for controlling a burst event of an explosive charge carried by a ballistic ordnance. The method includes generating pulses of coherent light. The method includes non-mechanically directing each of the generated pulses of coherent light at a corresponding directed angle relative to an optical axis, each of the corresponding directed angles being within a scanning field of view. The method detecting the pulses of coherent light reflected from a ground surface. The method includes determining, based on a time difference between generating the pulses of coherent light and detecting the pulses of coherent light reflected from the ground surface, a distance between the system and the ground surface. The method includes generating, based on a functional relation between the directed angle and the determined distance between the system and the ground surface, a topographical map of the ground surface. The method also includes controlling, based on the determined distance between the system and the ground surface, a timing of the burst event of the explosive charge carried by the ballistic ordnance.

A further embodiment of the foregoing method, wherein controlling the timing of the burst event of the explosive charge can include generating a burst control signal configured to initiate the burst event of the explosive charge carried by the ballistic ordnance.

A further embodiment of any of the foregoing methods, wherein the burst control signal can be generated when the determined distance between the system and the ground surface is less than or equal to a predetermined Height of Burst (HoB).

A further embodiment of any of the foregoing methods can further include controlling, based on the generated topographical map of the ground surface, a direction of the burst event.

A further embodiment of any of the foregoing methods, wherein controlling the direction of the burst event can include generating a burst control signal configured to direct the explosive charge carried by the ballistic ordnance in a target direction.

A further embodiment of any of the foregoing methods, wherein the target direction corresponds to a direction substantially normal to the ground surface.

A further embodiment of any of the foregoing methods can further include comparing features of the topographical map of the ground surface with features of a predetermined target.

A further embodiment of any of the foregoing methods can further include determining, based on the comparison of features of the generated topographical map of the ground surface with features of the predetermined target, a direction of the predetermined target.

A further embodiment of any of the foregoing methods can further include controlling, based on the generated topographical map of the ground surface, a direction of the burst event.

Some embodiments relate to a system for controlling a burst event of an explosive charge carried by a ballistic ordnance. The system includes a controller. The system includes a laser electrically coupled to the controller. The laser generates, in response to receiving from the controller a timing signal at an emission time, a pulse of coherent light. The system includes a light emitter optically coupled to receive the generated pulse of coherent light from the laser and to emit the received coherent light. The system includes an optical detector electrically coupled to the controller. The optical detector is configured to detect the directed beam of light reflected by a ground surface at a detection time. The system includes a two-dimensional array of photonic receivers, each configured to transmit, via an optical wave guide, light received by the photonic receiver to the photodetector. The system also includes a plurality of phase modulators electrically coupled to the controller. The plurality of phase modulators configured to coordinate, in response to receiving from the controller a signal indicative of a reception angle, relative phases of the light received by each of the plurality of photonic receivers. The controller is further configured to calculate, based on a difference between the detection time and the emission time, a distance between the system and the ground surface. The controller is further configured so generate a burst control signal configured to initiate the burst event of the explosive charge carried by the ballistic ordnance.

A further embodiment of the foregoing system can further include a two-dimensional array of light emitters, each optically coupled to receive a portion of the generated pulse of coherent light from the laser via an optical wave guide, and to emit the received portion of coherent light. The plurality of phase modulators can be further configured to coordinate, in response to receiving from the controller a signal indicative of an emission angle, relative phases of the emitted portions of optical light so as to form a beam of light directed at the emission angle.

Some embodiments relate to a system for controlling an explosive burst event of a ballistic ordnance. The system includes a ballistic ordnance having an explosive charge. The system a phased-array LIDAR system coupled to the ordnance. The phased-array LIDAR system includes: a laser; a two-dimensional array of light emitters, each optically coupled to the laser via an optical wave guide; a plurality of phase modulators, each corresponding to one of the light emitters in the two-dimensional array; and an optical detector. The system one or more processors and computer-readable memory. The computer readable memory is encoded with instructions that, when executed by the one or more processors, cause the system to generate, at an emission time, a pulse of coherent light, using the laser. The computer readable memory is encoded with instructions that, when executed by the one or more processors, cause the system to coordinate, using the plurality of phase modulators, the plurality of phase modulators so that a combined emission of two-dimensional array forms a directional beam having a directed angle relative to an optical axis, each of the directed angles being within a scanning field of view. The computer readable memory is encoded with instructions that, when executed by the one or more processors, cause the system to detect, at a detection time, the directional beam reflected by a ground surface, using the optical detector. The computer readable memory is encoded with instructions that, when executed by the one or more processors, cause the system to calculate, based on a difference between the detection time and the emission time, a distance between the system and the ground target. The computer readable memory is encoded with instructions that, when executed by the one or more processors, also cause the system to control an explosive charge when the calculated distance between the system and the ground target is substantially equal to the predetermined Height of Burst (HoB).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for controlling a burst event of an explosive charge carried by a ballistic ordnance, the system comprising:
a controller;
a laser electrically coupled to the controller, the laser generating, in response to receiving from the controller a timing signal at an emission time, a pulse of coherent light;
a two-dimensional array of light emitters, each optically coupled to receive a portion of the generated pulse of coherent light from the laser via an optical wave guide, and to emit the received portion of coherent light;
a plurality of phase modulators electrically coupled to the controller, the plurality of phase modulators configured to coordinate, in response to receiving from the controller a signal indicative of an emission angle, relative phases of emitted portions of the coherent light so as to form a beam of light directed at the emission angle; and
an optical detector electrically coupled to the controller, the optical detector configured to detect the directed beam of light reflected by a ground surface at a detection time,
wherein the controller is further configured to:
calculate, based on a difference between the detection time and the emission time, a distance between the system and the ground surface; and
generate a burst control signal configured to initiate the burst event of the explosive charge carried by the ballistic ordnance.

2. The system of claim 1, wherein the burst control signal is generated in response to the calculated distance between the system and the ground target being less than a predetermined Height of Burst (HoB).

3. The system of claim 1, wherein controller is further configured to:
coordinate the laser and the phase modulators to form a plurality of beams to be emitted over a corresponding plurality of emission angles; and
generate, based on a functional relation between the calculated distances and the emission angles corresponding to the plurality of beams, a topographical map of the ground surface.

4. The system of claim 3, wherein the generated burst control signal is indicative of a burst direction relative to the optical axis.

5. The system of claim 4, wherein the burst direction corresponds to a direction substantially normal to the ground surface.

6. The system of claim 3, wherein the controller is further configured to:
compare features of the generated topographical map of the ground surface with features of a predetermined target.

7. The system of claim 6, wherein the controller is further configured to:
determine, based on the comparison of features of the generated topographical map of the ground surface with features of the predetermined target, a direction of the predetermined target relative to the optical axis.

8. The system of claim 7, wherein the generated burst control signal is indicative of a burst direction relative to the optical axis, and wherein the burst direction corresponds to the determined direction of the predetermined target.

9. The system of claim 1, wherein the plurality of phase modulators is a first plurality of phase modulators, the system further comprising:
a two-dimensional array of photonic receivers, each configured to transmit, via an optical wave guide, light received by the photonic receiver to the photodetector; and a second plurality of phase modulators electrically coupled to the controller, the second plurality of phase modulators configured to coordinate, in response to receiving from the controller a signal indicative of a reception angle, relative phases of the light received by each of the plurality of photonic receivers.

10. The system of claim 1, wherein the laser, the two-dimensional array of optical emitters, the wave guides and the phase modulators comprise a unitary integrated photonics device.

11. A method for controlling a burst event of an explosive charge carried by a ballistic ordnance, the method comprising:
generating, using a laser, pulses of coherent light;
non-mechanically directing each of the generated pulses of coherent light at a corresponding directed angle relative to an optical axis, each of the corresponding directed angles being within a scanning field of view;
detecting, using an optical detector, the pulses of coherent light reflected from a ground surface;
calculating, using a controller and based on a time difference between generating the pulses of coherent light and detecting the pulses of coherent light reflected from the ground surface, a distance between the system and the ground surface;
generating, using the controller and based on a functional relation between the directed angle and the determined distance between the system and the ground surface, a topographical map of the ground surface; and
controlling, based on the determined distance between the system and the ground surface, a timing of the burst event of the explosive charge carried by the ballistic ordnance.

12. The method of claim 11, wherein controlling the timing of the burst event of the explosive charge includes:
generating a burst control signal configured to initiate the burst event of the explosive charge carried by the ballistic ordnance.

13. The method of claim 12, wherein the burst control signal is generated when the determined distance between the system and the ground surface is less than or equal to a predetermined Height of Burst (HoB).

14. The method of claim 11, further comprising:
controlling, based on the generated topographical map of the ground surface, a direction of the burst event.

15. The method of claim 14, wherein controlling the direction of the burst event includes:
generating a burst control signal configured to direct the explosive charge carried by the ballistic ordnance in a target direction.

16. The method of claim 11, further comprising:
comparing features of the topographical map of the ground surface with features of a predetermined target.

17. The method of claim 16, further comprising:
determining, based on the comparison of features of the generated topographical map of the ground surface with features of the predetermined target, a direction of the predetermined target.

18. The method of claim 17, further comprising:
controlling, based on the generated topographical map of the ground surface, a direction of the burst event.

19. A system for controlling a burst event of an explosive charge carried by a ballistic ordnance, the system comprising:
a controller;
a laser electrically coupled to the controller, the laser generating, in response to receiving from the controller a timing signal at an emission time, a pulse of coherent light;
a light emitter optically coupled to receive the generated pulse of coherent light from the laser and to emit the received coherent light;
an optical detector electrically coupled to the controller, the optical detector configured to detect a beam of coherent light reflected by a ground surface at a detection time;
a two-dimensional array of photonic receivers, each configured to transmit, via an optical wave guide, light received by the photonic receivers to the optical detector; and
a plurality of phase modulators electrically coupled to the controller, the plurality of phase modulators configured to coordinate, in response to receiving from the controller a signal indicative of a reception angle, relative phases of the light received by each of the plurality of photonic receivers;
wherein the controller is further configured to:
calculate, based on a difference between the detection time and the emission time, a distance between the system and the ground surface; and
generate a burst control signal configured to initiate the burst event of the explosive charge carried by the ballistic ordnance.

20. The system of claim 19, further comprising:
a two-dimensional array of light emitters, each optically coupled to receive a portion of the generated pulse of coherent light from the laser via an optical wave guide, and to emit the received portion of coherent light, wherein the plurality of phase modulators are further configured to coordinate, in response to receiving from the controller a signal indicative of an emission angle, relative phases of the emitted portions of optical light so as to form a beam of light directed at the emission angle.

* * * * *

UNITED STATES PATENT AND TRADEMARK OFFICE
CERTIFICATE OF CORRECTION

PATENT NO. : 10,281,254 B2
APPLICATION NO. : 15/270829
DATED : May 7, 2019
INVENTOR(S) : David Ginsberg et al.

It is certified that error appears in the above-identified patent and that said Letters Patent is hereby corrected as shown below:

In the Specification

Column 6, Line 33:
Delete "photodetector"
Insert -- photo-detector --

Column 8, Line 26:
Delete "ink"
Insert -- inc --

Signed and Sealed this
Ninth Day of July, 2019

Andrei Iancu
*Director of the United States Patent and Trademark Office*